United States Patent [19]

Wachi et al.

[11] Patent Number: 5,199,550
[45] Date of Patent: Apr. 6, 1993

[54] BELT TYPE TRANSFER APPARATUS AND SECTIONAL ROLLER USED THEREIN

[75] Inventors: Hitoshi Wachi, Fujioka; Houji Yamato, Isesaki, both of Japan

[73] Assignee: Nippon Kayaku Kabushiki Kaisha, Tokyo, Japan

[21] Appl. No.: 752,626

[22] PCT Filed: Dec. 12, 1989

[86] PCT No.: PCT/JP89/01244
§ 371 Date: Aug. 9, 1991
§ 102(e) Date: Aug. 9, 1991

[87] PCT Pub. No.: WO91/08969
PCT Pub. Date: Jun. 27, 1991

[51] Int. Cl.$^5$ ............................................. B65G 15/14
[52] U.S. Cl. .............................. 198/626.1; 198/626.5
[58] Field of Search ................ 198/626.1, 626.5, 626.6

[56] References Cited

U.S. PATENT DOCUMENTS

| 1,958,341 | 5/1934 | Hurxthal ........................ 198/626.1 X |
| 2,805,762 | 9/1957 | Kampfer ........................... 198/626.6 |
| 2,987,166 | 6/1961 | Gray ............................. 198/626.6 X |
| 3,350,842 | 11/1967 | Renish . |
| 3,767,028 | 10/1973 | Rosso ............................. 198/33 AC |
| 4,164,996 | 8/1979 | Tomlinson . |
| 4,285,625 | 8/1981 | Yamada . |
| 4,390,135 | 6/1983 | Wakamatsu et al. . |
| 4,938,649 | 7/1990 | fer Horst et al. ............. 198/626.1 X |

FOREIGN PATENT DOCUMENTS

| 0063404 | 4/1945 | Denmark ......................... 198/626.1 |
| 0688033 | 8/1930 | France ............................ 198/626.1 |
| 52-84889 | 6/1977 | Japan . |
| 62-167120 | 7/1987 | Japan . |
| WO85/03497 | 8/1985 | PCT Int'l Appl. . |
| 0410817 | 5/1934 | United Kingdom ............. 198/626.5 |
| 684798 | 12/1952 | United Kingdom ............. 198/626.6 |
| 2146965 | 5/1985 | United Kingdom ............. 198/626.1 |

Primary Examiner—D. Glenn Dayoan
Attorney, Agent, or Firm—Nields & Lemack

[57] ABSTRACT

A belt-type transfer apparatus suitable for transferring objects such as medial ampules or vials or bottles or cans stuffed with beverages or foods, by clamping the objects between successive pairs of opposing belts which are wound on two rows of multiplicity of successive rollers arranged in the direction of the transfer. The arrangement is such that, in the region near one of the rollers of one of said rows around which belts are wound to provide different directions of transfer, the belts associated with the rollers of the other row are arranged to intersect each other at their sides for clamping said object, so that these belts are made to flex when the object passes through the above-mentioned region, thus allowing a smooth change of direction of the transfer. At least one of the rollers disposed in the region where the transfer direction is changed is a sectional roller which is composed of a plurality of pulley segments carried by a common shaft for independent rotation. Belts running at different speeds are wound on the pulley segments of the sectional roller so that the pulley segments are rotated independently at speeds corresponding to the speeds of these belts, thus absorbing any difference in the rotation speed.

4 Claims, 6 Drawing Sheets 5,199,550

BELT TYPE TRANSFER APPARATUS AND SECTIONAL ROLLER USED THEREIN

TECHNICAL FIELD

The present invention relates to a belt type transfer apparatus which can safely transfer to a destined location various types of objects such as columnar objects, e.g., ampules or vials filled with medical liquids, bottles or cans of foods or beverages, and so forth. More particularly, the present invention is concerned with a belt type transfer apparatus an sectional rollers used in the apparatus, wherein the arrangement of rollers and the manner in which belts are stretched around these rollers are so improved as to enable direction of transfer to be switched without requiring any change-over operation and to enable absorption of any difference in the rotation speed of the rollers which occurs at predetermined portion of the apparatus due to a change in the transfer speed.

BACKGROUND ART

Conventionally, small cylindrical medical bottles such as ampules, vials or the like are successively filled with a medical liquid in a clean room (aseptic room) by a filing machine, encased in cases and then brought to the exterior of the clean room (aseptic room).

In the production of such bottled medical liquid, it is a key for the guarantee of the quality to enhance the cleanness (asepsis) during filling. To this end, it is most convenient to minimize the volume of the clean room, while serving as much as possible the number of workers and machines in the clean room, so as to enable the bottles stuffed with the liquid to be directly conveyed to the exterior of the clean room without any manual labor.

To cope with such a demand, the applicant has proposed a belt type transfer apparatus of the type which is disclosed in Japanese Patent Laid-Open No. 62-167120.

This belt type transfer apparatus has, as shown in FIG. 9, a row of rollers 1 extending in the direction of the transfer or convey and another row of rollers 2 arranged at predetermined spacing from the first row. Belts 3 are stretched between rollers 1, 1 and also between rollers 2, 2 so that two rows of groups of belts are formed in pairs, the rollers 1 and the rollers 2 are driven by a driving system at the same speed so that objects 4 such as ampules are pinched between and transferred by the belts 3.

An example of this type of transfer apparatus will be described with reference to FIG. 10. In this belt type transfer apparatus, two rows of rollers 1 and 2 are arranged to define a path which first extends horizontally and then vertically or a path in which the objects which are being transferred are progressively turned sideways and then upright. The belts 3 are stretched over these rollers and the rollers 1 and 2 are driven at the same speed by a driving unit such as a motor which is disposed at the outlet end of the path, whereby the objects are conveyed from the clean room 6 to the exterior 8 via the intermediate chamber 7. This belt type transfer apparatus enables the objects 4 such as ampules to be safely and stably conveyed to a destined position over a long distance without requiring any specific attention to timing of the transfer, thus contributing to enhancement of the asepsis and realization of unmanned operation. This transfer system can transfer the objects 4 in any desired direction over a long distance. For changing the transfer direction, a pair of rollers 1 and 2 are provided at a corner or region where the direction is to be changed and belts 3, 3 are stretched to define the new direction of the transfer path. The distance between the rollers 1 and 2 must be maintained constant in conformity with the size of the object 4 to be transferred. This requires that the distance between the pair of the rollers 1 and 2 be delicately adjusted in accordance with the size of the object 4 to be transferred. If this adjustment is failed, troubles are caused such as collapse of the object 4 due to too narrow gap between the rollers or dropping or throwing of the object 4 due to too large gap between the rollers.

In addition, readjustment of the gap between the rollers is necessary each time the type of the object 4 to be transferred is changed, in conformity with the size of the new type of the object 4. Thus, the known transfer apparatus could not be used for a plurality of types of objects having different sizes.

Another problem encountered with this known transfer apparatus is that, when the objects 4 are transferred at high speed, it is not easy to receive and encase the objects 4 which jump off the outlet of the transfer apparatus. Deceleration is necessary to obviate this problem and to ensure a smooth delivery of the objects 4 to a next step. Problems are caused also when a plurality of driving motors are used for a long-distance transfer. In such a case, adjacent rollers may be driven at different speeds, causing mechanical overload between the rollers and the belts, resulting in damages of the rollers 1, 2 and the belts 3 or rubbing of the rollers and belts to generate dust which causes contamination. It is therefore necessary to smoothly absorb any difference in the rotation speed between adjacent rollers at selected region of the transfer apparatus where any difference of roller speed takes place.

The present inventors have discovered, as a result of an intense study, that a belt type transfer apparatus capable of changing transfer direction regardless of the size of the object without requiring any readjustment is obtainable by adopting a specific arrangement of rollers and a specific manner of setting the belts. The inventors also have found that any difference in the rotation speed of the rollers due to a change in the transfer speed can be absorbed smoothly by a specific construction of the roller.

An object of the present invention is to provide a belt type transfer apparatus which can smoothly change the transfer direction and which can transfer different types of objects of different diameters without causing breakage of the bottle.

Another object of the present invention is to provide sectional roller for use in a belt type transfer apparatus,- capable of absorbing any difference in the rotation speed between adjacent rollers.

DISCLOSURE OF INVENTION

According to one aspect of the present invention, there is provided a belt-type transfer apparatus having two rows of rollers arranged to extend in a desired direction of transfer; pairs of belts wound around successive rollers of the respective rows so as to form two trains of belts and so as to clamp therebetween an object to be conveyed; and at least one drive roller included in each row of rollers and adapted to be driven by a drive unit so as to drive the belts associated with the rollers of the same row, thereby enabling the pair of trains of belts to clamp and transfer the object, wherein the improvement comprises that, in the vicinity of one of the rollers of one of the rows around which belts are wound to provide different directions of transfer, the belts associated with the rollers of the other row are arranged to intersect each other at their sides for clamping the object, thereby enabling the direction of transfer of the object to be changed. The direction of transfer of the object is changed when it passes by the above-mentioned roller around which belts are wound to provide different directions of transfer. Since the belts associated with the rollers of the other row are arranged to intersect each other at their sides for clamping the object in the region near the above-mentioned roller, the intersecting belts are made to flex in accordance with the side of the object so that the direction of transfer can be changed smoothly regardless of a slight variation in the size of the object. This also enables objects of different sizes to be transferred by the same apparatus without requiring any readjustment.

The invention also provides a sectional roller for use in a belt type transfer apparatus, comprising a plurality of segregation pulley fitted by a common shaft for independent rotation. Belts running at different speeds are wound on different segregation pulley, so that the pulley segments rotate independently of each other at the speeds of the associated belts, thus absorbing the difference in the rotation speed. Consequently, any mechanical overload due to difference in the rotation speed of rollers is eliminated to reduce damaging, while prolonging the life, of the parts and to prevent contamination attributable to generation of dust which otherwise may be caused.

THE BEST MODE FOR CARRING OUT THE INVENTION

The invention will be more fully described with reference to the accompanying drawings.

Figure 1:
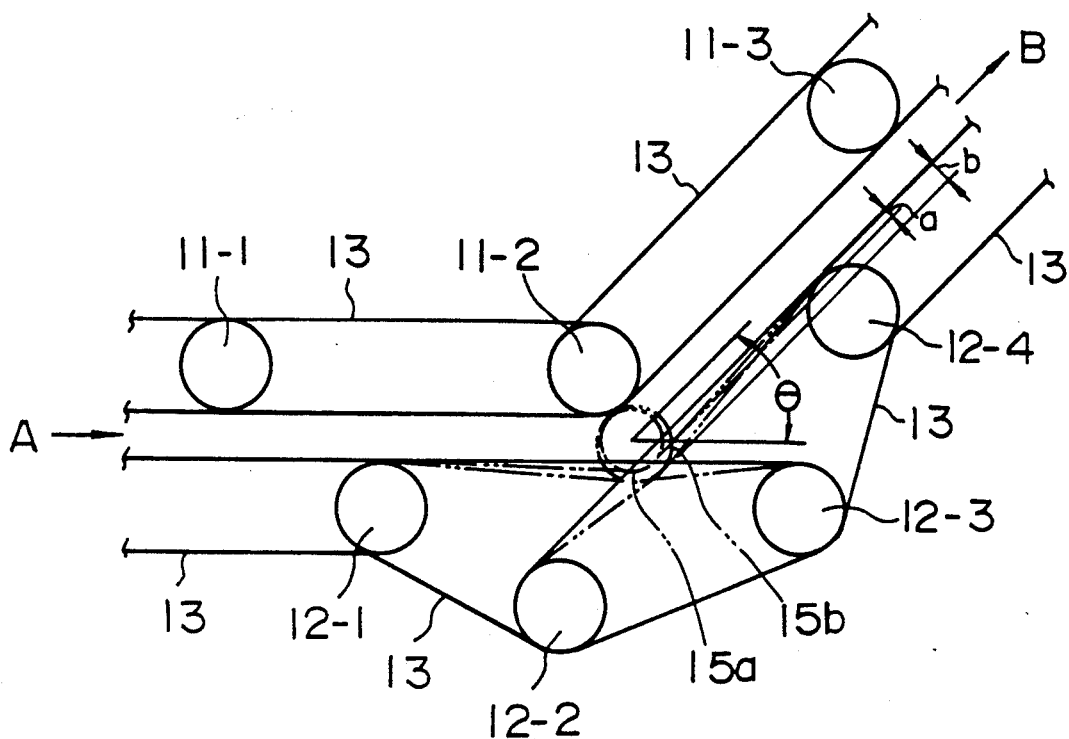
FIG. 1 is an illustration of arrangement of rollers and the manner in which belts are engaged with the rollers in a first embodiment of the present invention.
Figure 2:
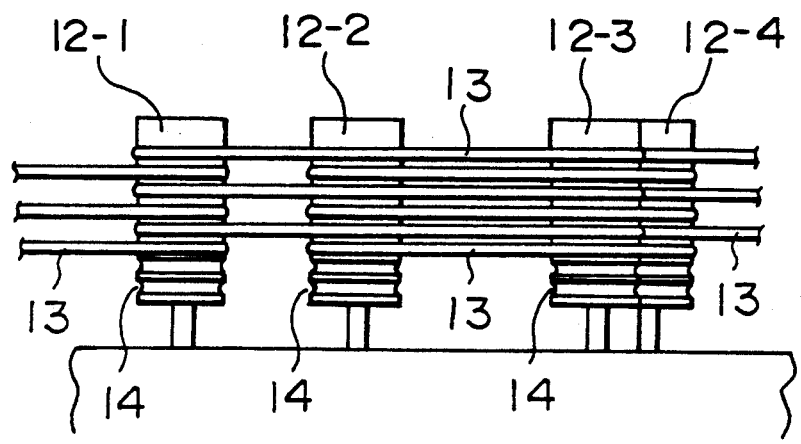
FIG. 2 is a side elevational view of the embodiment shown in FIG. 1.

FIG. 1 is an illustration of arrangement of rollers and the manner in which belts are engaged with the rollers in a first embodiment of the present invention and FIG. 2 is a side elevational view of the embodiment shown in FIG. 1. In these figures, rollers 11-1, 11-2, 11-3 of a first row are arranged in a region where the direction of transfer is changed. Similarly, rollers 12-1, 12-2, 12-3 and 12-4 are arranged to form a second row in this region. Each of the rollers 11-1 to 11-3 and 12-1 to 12-4 is provided in their peripheral surfaces with a plurality of grooves 14 for receiving belts 13. In the first row of the rollers, the rollers 11-1 and 11-3 are so arranged that the direction of path of transfer is flexed around the roller 11-2 by an angle $\theta$ from a direction A to a direction B. Different belts are stretched between the rollers 11-1 and 11-2 and between the rollers 11-2 and 11-3. In the other row of the rollers, the roller 12-3 is positioned on the extension of the transfer path in the direction A, whereas the roller 12-2 is positioned on the extension of the transfer path in the direction B. A plurality of belts are alternately arranged around the rollers 12-1, 12-2, 12-3 and around the rollers 12-2, 12-3 and 12-4. Thus, the belts 13 around the rollers 12-1, 12-2, 12-3 and the belts 13 around the rollers 12-2, 12-3 and 12-4 are arranged to intersect each other at the angle $\theta$ at their nipping runs, at a position in the vicinity of the roller 11-2 of the first row at which the direction of path is changed. The rollers 11 and 12 of the two rows are arranged such that the surfaces of the belts 13 for clamping the object 15 is spaced by a distance which is slightly smaller than the size of an article 15 to be transferred. These rollers 11, 12 are power-driven to run at constant speed by driving units which are not shown.

In operation, the object 15 is pinched between and conveyed by the belts 13, 13 in the direction A and, after passing the region around the roller 11-2, conveyed in the direction B. When the object 15 makes a turn around the roller 11-2, the belts 13, 13 on the rollers 12 of the second row, intersecting each other at the angle $\theta$ at their straight runs, are allowed to flex in the direction normal to the direction of convey in accordance with the size of the object 15. More specifically, as will be see from FIG. 1, the belts 13, 13 flex only by a small amount (a) when the object 15a has a small size, whereas, when object has a large size as denoted by 15b, the belts 13, 13 flex by a large amount (b). It is therefore possible to eliminate troubles such as breakage of the object 15 due to too small spacing or dropping or throwing of the same due to too large spacing. In addition, there is not need for conducting readjustment of the spacing of rollers for the transfer of objects 15a, 15b of different sizes, because the belts 13,13 conveniently flex at the region where the direction of the transfer is changed.

Figure 3:
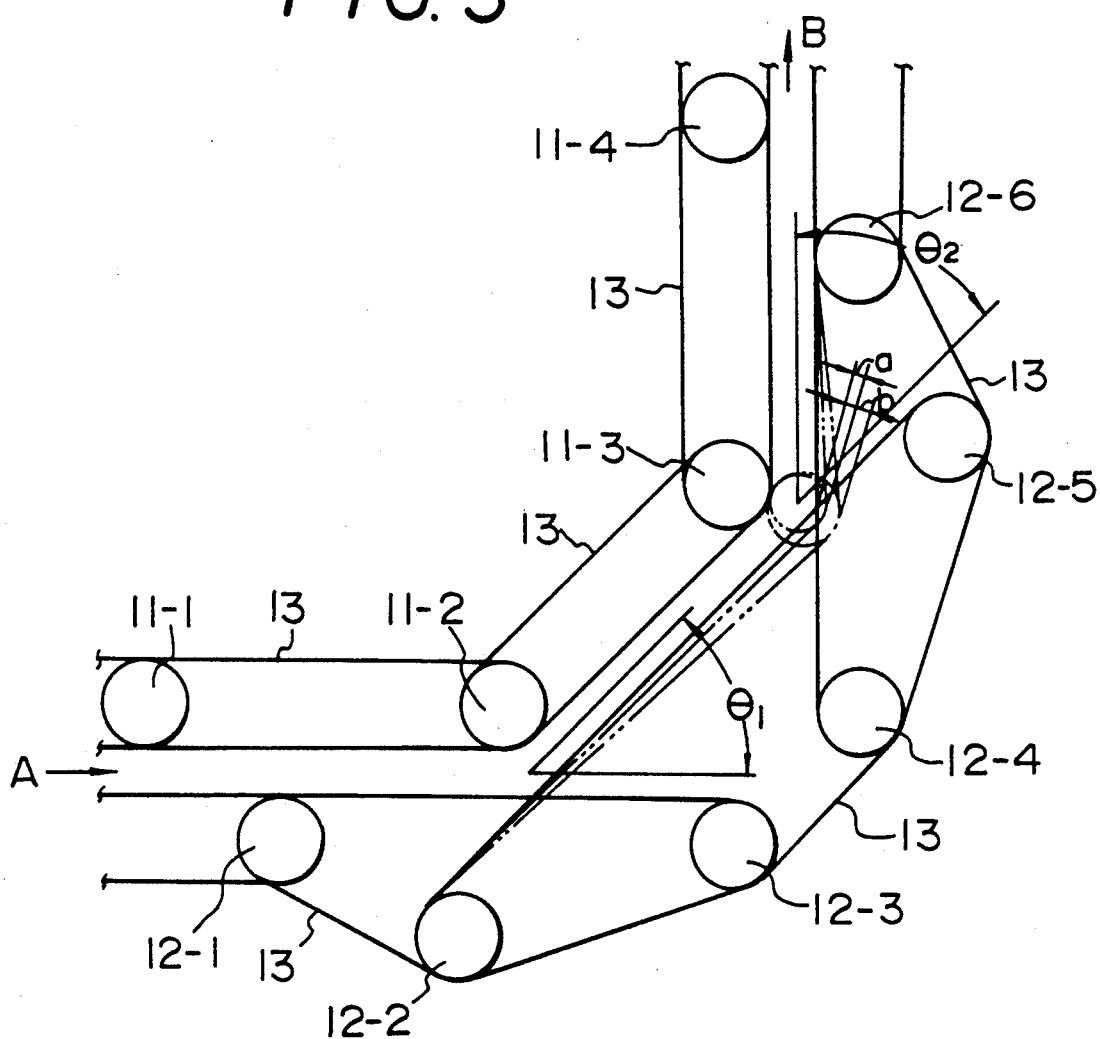
FIG. 3 is an illustration of arrangement of rollers and the manner in which belts are engaged with the rollers in a second embodiment of the present invention.
Figure 4:
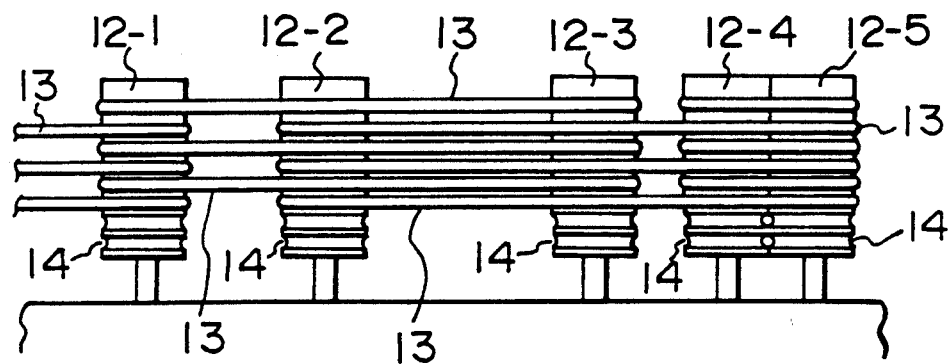
FIG. 4 is a side elevational view of the embodiment shown in FIG. 3.

FIG. 3 is an illustration of the manner in which rollers are arranged and the manner in which belts are engaged with these rollers in a second embodiment of the present invention. Rollers 11-1, 11-2, 11-3 and 11-4 are arranged to form a row which is curved or bent along the path of transfer. Rollers 12-1, 12-2, 12-3, 12-4, 12-5 and 12-6 are arranged to form the other row of rollers. More specifically, the rollers 11-1, 11-2, 11-3 and 11-4 are so arranged that the direction of convey is changed by an angle $\theta_1$ from the initial direction A around the roller 11-2 and further changed by an angle $\theta_2$ about the roller 11-3. Belts 13, 13 are stretched between the pairs of successive rollers 11-1, 11-2, 11-3 and 11-4 as illustrated. In the other row of the rollers, the roller 12-3 is disposed on the extension of the direction A, while the roller 12-2 is arranged on the extension of a line which intersects the direction A at the angle $\theta_1$. In addition, the roller 12-5 is disposed on the extension of the above-mentioned line which intersects the direction A at the angle $\theta_1$, at the opposite side to the roller 12-2. The roller 12-4 is disposed on the extension of the line parallel to the direction B of the transfer. A plurality of belts are alternately wound around groups of rollers: namely, rollers 12-1, 12-2 and 12-3, rollers 12-2, 12-3, 12-4 and 12-5 and rollers 12-4, 12-5 and 12-6. Namely, the belts 13 going around the rollers 12-1, 12-2, 12-3 of the second row and the belts going around the rollers 12-2, 12-3, 12-4, 12-5 of the same row intersect each other at the angle $\theta_1$ at their nipping runs, in the region around the direction changing roller 11-2. Similarly, the belts 13 wound around the rollers 12-2, 12-3, 12-4 and 12-5 of the second row and the belts 13 wound around the rollers 12-4, 12-5 and 12-6 of the same row intersect each other at the angle $\theta_2$ at their nipping runs, in the region around the direction changing roller 12-3. Other portions are the same as those described before in connection with the first embodiment.

In operation, the object 15 is nipped between and conveyed by the belts 13,13 in the direction A and then makes a turn about the roller 11-2 by the angle $\theta_1$. The direction of is further changed by the angle $\theta_2$ about the roller 11-3 so that the object 15 is finally transferred in the direction B. As in the case of the first embodiment, the plurality of groups of belts 13, 13, 13 intersecting at angles $\theta_1$ and $\theta_2$ about the rollers 11-2 and 11-3, respectively, are made to flex by amounts corresponding to the size of the object 15 as the object passes by each direction changing roller 11-1,11-3. Thus, in the second invention, the change of the transfer direction from the direction A to the direction B is performed in stages: namely, first by an angle $\theta_1$ and then by angle $\theta_2$. In the illustrated embodiment, the angles $\theta_1$ and $\theta_2$ are respectively set to be 45° from the directions A and B.

Figure 5:
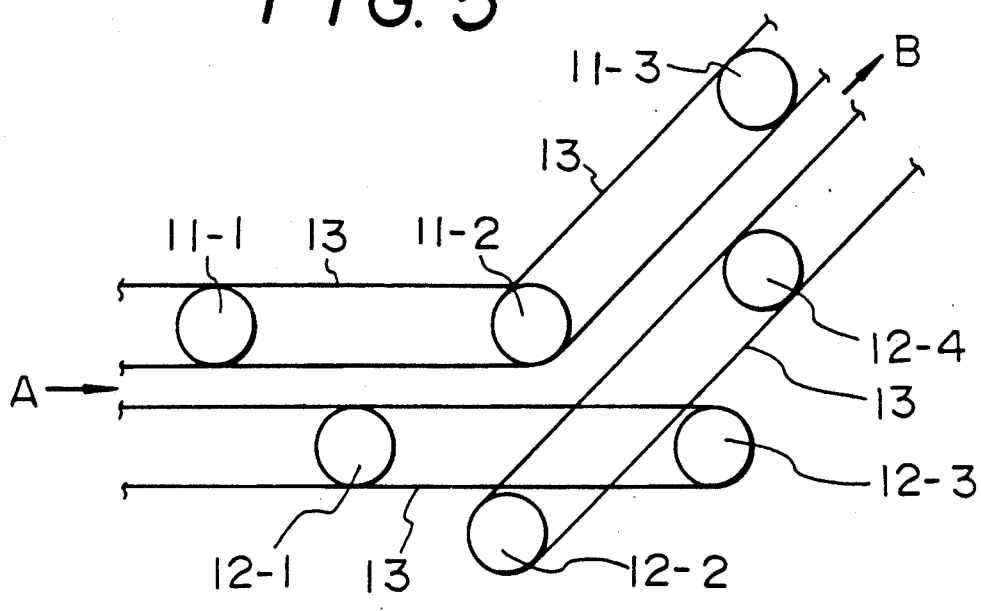
FIG. 5 is an illustration of the modification of the embodiments.
Figure 6:
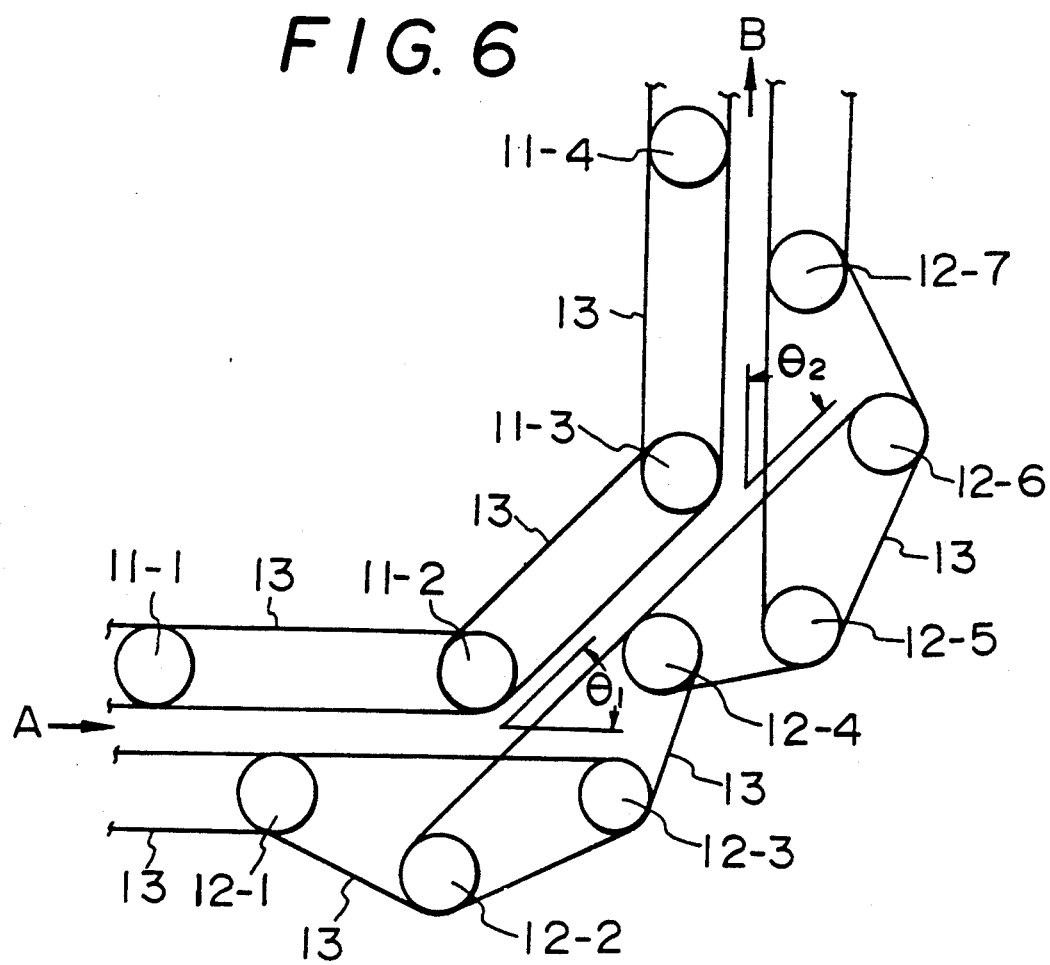
FIG. 6 is an illustration of another modification of the embodiment.

FIGS. 5 and 6 show different modifications of the described embodiments.

Referring first to FIG. 5 which shows a modification of the first embodiment, the rollers are arranged in the same manner as that in the first embodiment but the manner of winding of the belts 13 is changed. Namely, belts 13 are respectively wound around the rollers 12-1 and 12-3 and between the rollers 12-2 and 12-3 such that the belts around the rollers 12-1 and 12-3 and the belts around the roller 12-2 and 12-3 intersect each other.

The operation of this modification is substantially the same as that in the first embodiment. but the rollers 12-2 and 12-3 have to be driven separately from each other because they are not drivingly connected to each other.

In an arrangement shown in FIG. 6, a pair of roller and belt arrangements, each being the same as that described in the first embodiment, are arranged in series so as to provide a change in the transfer direction from the direction A to the direction B in stages, i.e., first by angle $\theta_1$ and then by angle $\theta_2$.

In this modification, the same effect is produced by each direction changing portion as that in the first embodiment. Consequently, the direction of transfer is changed from the direction A to the direction B in the same manner as the second embodiment. This modification, however, requires greater numbers of rollers 12-4 and belts 13 than the second embodiment.

The transfer apparatus of the present invention can transfer objects having diameters of several millimeters or greater. It has been confirmed that different types of ampules, having diameters varying between 10 mm and 18 mm could be transferred without necessitating readjustment of the apparatus.

Any number of belts, one,two or more, belts can be used between the rollers 11, as well as between the rollers 12. Thus, the number of belts used in parallel is determined to be,for example, 3 to 4, according to the size of the object 15 to be transferred. The belts may be flat or may be of the type used in the described embodiments. The material of belts also can be selected freely.

All what is required is that belts are wound on a direction changing roller in the first row so as to change the direction of convey and that belts on the rollers of the other row intersect each other at an angle substantially equal to the amount of change of the transfer direction at their pinching sides, in the region around the direction changing roller of the first row. The angle of intersection can be freely determined in accordance with the angle of change of the transfer direction.e.g.,- from several degrees up to 90°. Although the second embodiment as described employ two regions where the transfer direction is changed, it is possible to design the apparatus such that a plurality of such direction changing regions are provided. Furthermore, the belts are preferably arranged such that they intersect each other substantially at the midst of their runs between the associated rollers, in order to maximize the margin for the flexing of these belts.

Figure 7:
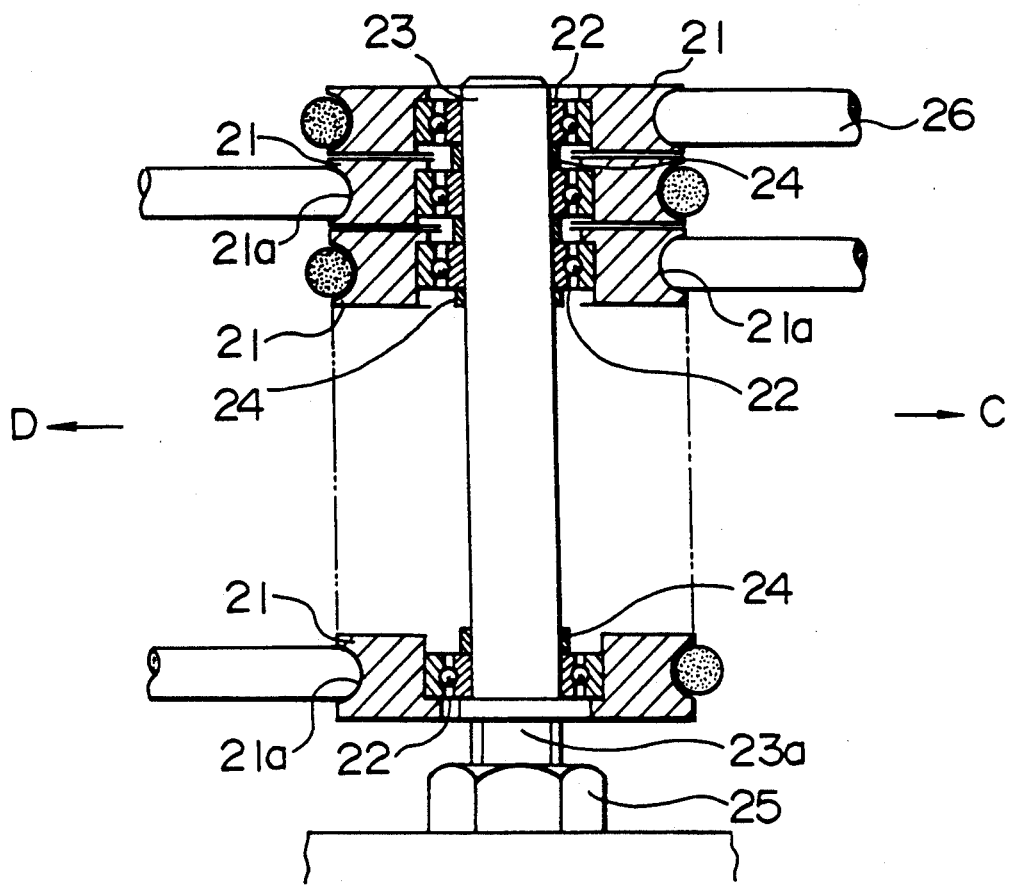
FIG. 7 is a sectional view of a sectional roller embodying the present invention.
Figure 8:
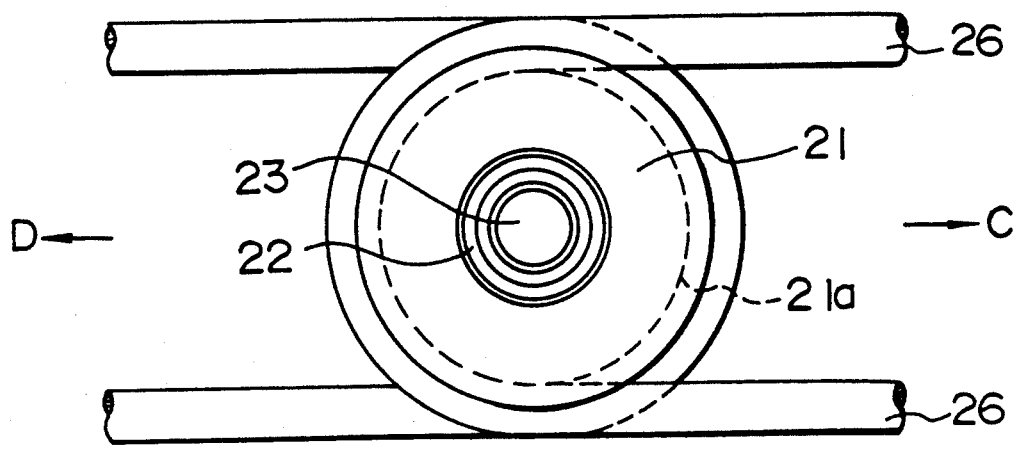
FIG. 8 is a plan view of the sectional roller.
Figure 9:
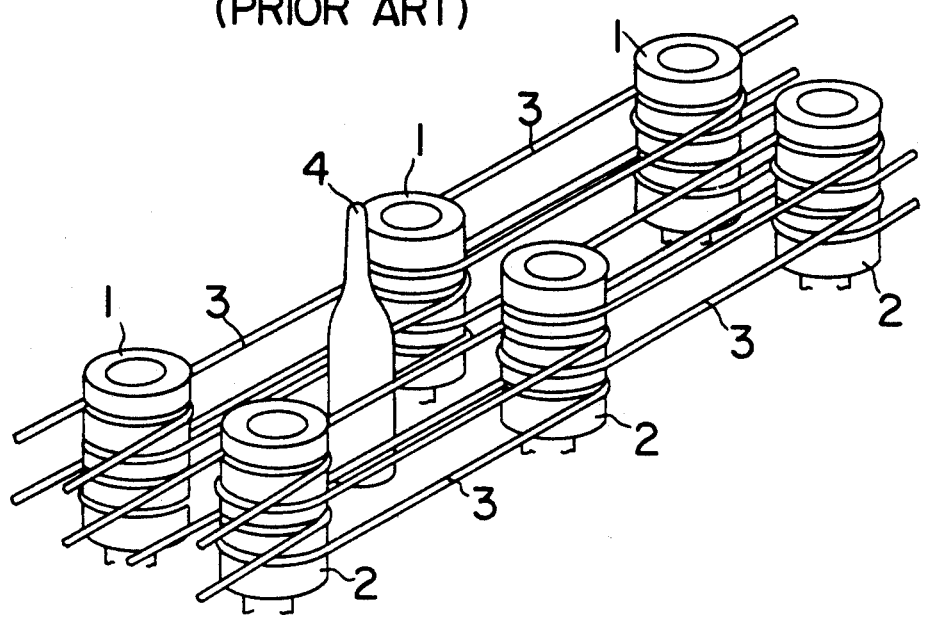
FIG. 9 is a perspective view of roller portion of a conventional belt type transfer apparatus.
Figure 11:
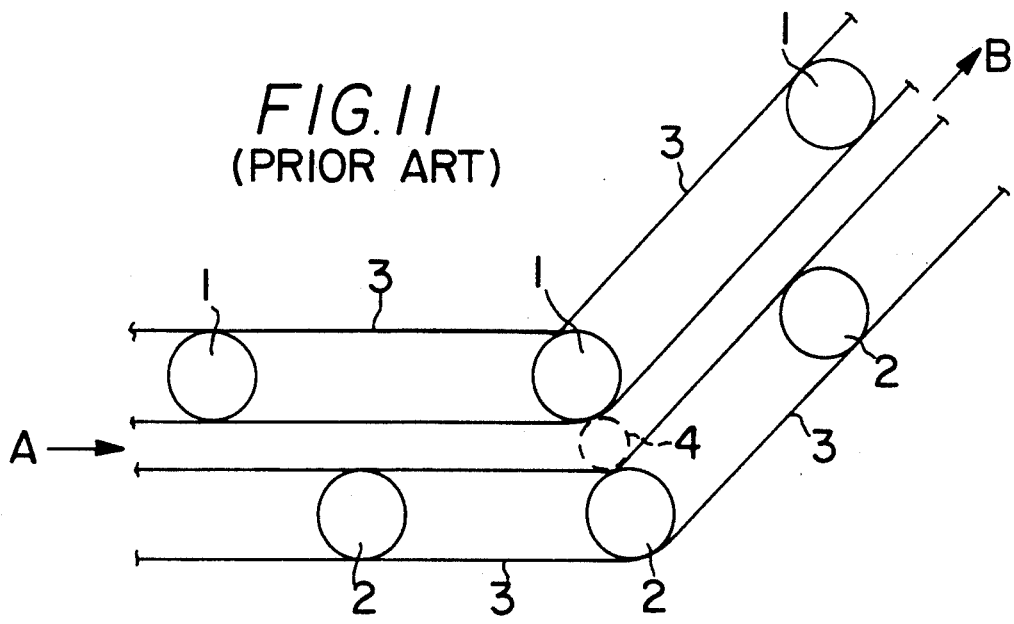
FIG. 11 is an illustration of a transfer-direction changing portion of the conventional belt type transfer apparatus.
Figure 10:
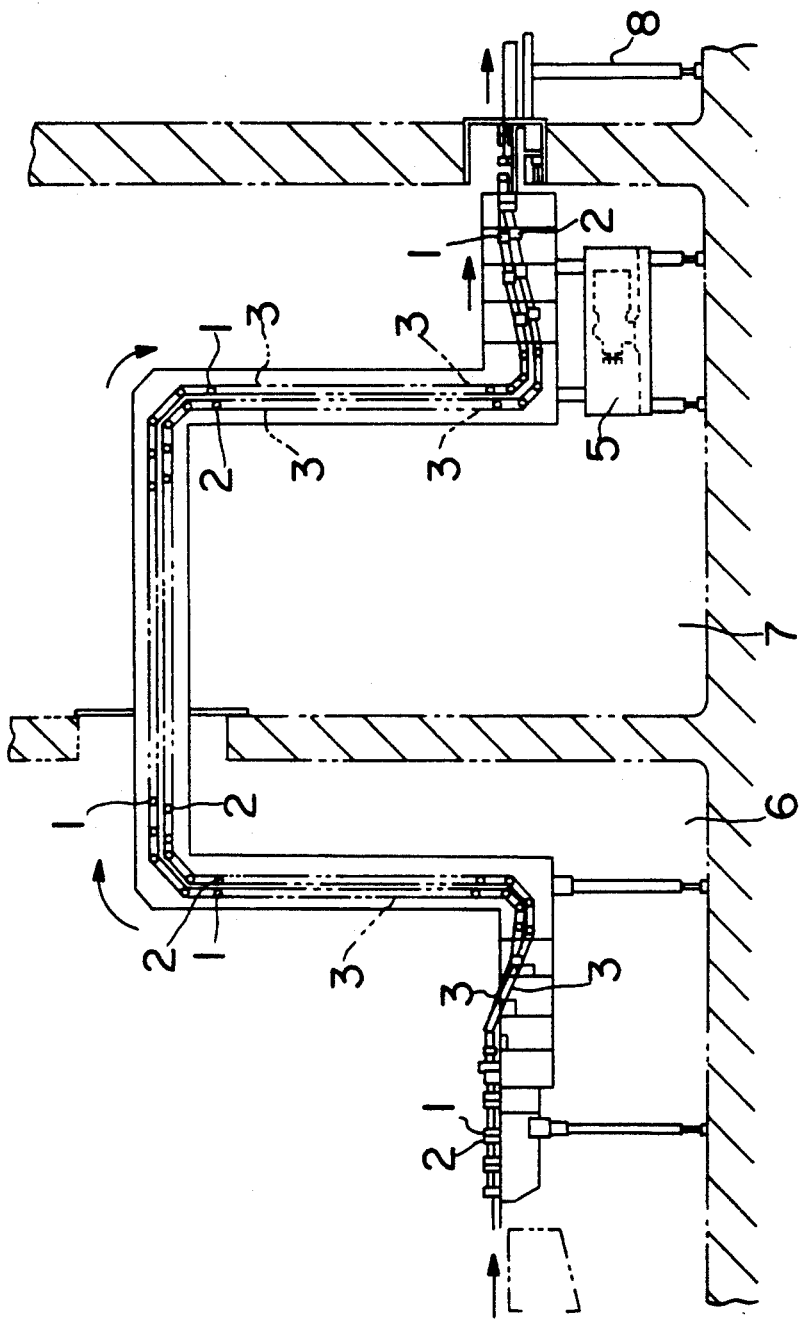
FIG. 10 is an illustration of a conventional belt type transfer apparatus.

FIG. 7 is a sectional view of a sectional roller embodying the present invention, while FIG. 8 is a plan view of the sectional roller. Referring to these Figures, the sectional roller has a plurality of pulley segments 21, bearings 22 and a shaft 23. The pulley segments 21 have an equal diameter and are respectively provided with substantially semi-circular grooves 21a formed in their outer peripheral surfaces so as to receive the belts 26. The pulley segments 21 are rotatably carried by the shaft 23 through respective bearings 22. Spacers 24 are provided between adjacent pulley segments 21 so as to maintain a constant interval between adjacent pulley segments 21. Although not exclusive, the number of the pulley segments 21 generally ranges between 2 and 20, preferably between 4 to 16. In case of the transfer of ampules,for example, eight pulley segments in total are used to enable the use of four belts. The shaft 23 is threaded at its one end as at 23a, and a fixing nut 25 is screwed to this threaded end 23a. Thus, the sectional roller is secured to the threaded end 23a of the shaft 23 by means of the nut 25.

Belts extending in a direction C and belts 26 extending in the direction D which is in 180° difference from the direction C are wound on alternating pulley segments 21 on each sectional roller. The pulley segments 21 associated with the the belts 26 extending in the direction C and the pulley segments 21 associated with the belts 26 extending in the direction D are rotatable independently of each other because they are rotatably supported by the shaft 23 through independent bearings 22. It is therefore possible to absorb any difference in the running speed between these belts. Consequently, any mechanical overload which may otherwise be caused due to difference in the rotation speed can be eliminated and the consequent dust generation due to rubbing is also avoided, thus preventing contamination. The sectional roller as described, when provided at the outlet of the belt type transfer apparatus or in the vicinity of inlet to the next step of process, can absorb any difference in the rotation speed caused by deceleration, thus ensuring gentle and smooth discharge of the objects without any fall-down or smooth delivery of the same to the next step of the process. Transfer of the object over a long distance usually requires a plurality of driving motors, which inevitably is accompanied by generation of difference in the rotation speed between the rollers driven by different motors. The sectional roller of the invention can effectively absorb such a difference in the rotation speed, thus making a great contribution to the improvement in the production efficiency in the long-distance transfer of the objects. Furthermore, the sectional roller of the invention, when used in the belt type transfer apparatus of the invention having improved roller and belt arrangement, ensures a smooth change of the transfer direction by absorbing any difference in the rotation speed of the rollers.

The sectional roller of the present invention, when used in a transfer apparatus for transferring ampules, vials or the like, preferably has eight pulley segments to enable use of four belts in each direction, i.e., eight belts in total in alternating direction. This number of pulley segments, however, is only illustrative and the sectional pulley of the present invention essentially requires at least two pulley segments which are rotatably mounted on the shaft 23 and which are adapted to engage with belts running at different speeds.

The size and the number of the pulley segments can be suitably determined in accordance with the shape and length of the article to be conveyed, without being restricted to those in the described embodiments.

The belts engaging with the pulley segments may have circular cross-section as in the illustrated embodiment or may be flat belts. The shape of the grooves is determined in accordance with the cross-sectional shape of the belt.

It is not essential that two groups of belts extending from one sectional roller form 180° angle therebetween: namely, these two groups of belts may be arranged to form any desired angle therebetween in conformity with th angle through which the transfer direction is changed.

INDUSTRIAL APPLICABILITY

As will be understood from the foregoing description, the belt type transfer apparatus of the present invention enables a smooth change of the direction of transfer without requiring any readjustment despite any change in the size of the object to be transferred. The apparatus, therefore, can suitably be used in transferring ampules or vials charged with medial liquids, as well as bottles and cans stuffed with beverages and foods. Furthermore, the sectional roller in accordance with the present invention can suitably be used in a belt-type transfer apparatus employing pairs of belts, because it can absorb any change in the rotation speed of rollers caused by a variation in the transfer speed.

What is claimed is:

1. In a belt-type transfer apparatus for conveying an object, means for changing the direction of said conveyance from a first direction to a second direction displaced from said first direction by an angle $\theta$, said means comprising:

a first plurality of rollers;

a first set of belts wound around successive rollers in said first plurality;

a second plurality of rollers spaced from said first plurality; said second plurality of rollers comprising at least a first, second, third and fourth roller;

a second set of belts wound around said second plurality of rollers, said second set of belts comprising at least a first belt and a second belt, said first and second sets of belts defining a path of travel therebetween for said object, said object being held in said path of travel by said first and second sets of belts;

wherein at least one of said first plurality of rollers is arranged with respect to said other of said first plurality of rollers so as to cause said object to change direction, and wherein said second set of belts is wound such that said first belt is wound around at least said first, second and third roller and said second belt is wound around at least said second, third and fourth roller such that said object is held in said path of travel by said first belt during conveyance in said first direction, by said first and second belts during said change in direction, and by said second belt during conveyance in said second direction.

2. The belt-type transfer apparatus of claim 1, wherein the rollers of each of said first and second plurality of rollers include at least one sectional roller which comprises a plurality of pulley segments carried by a shaft for independent rotation.

3. The belt-type transfer apparatus of claim 1, wherein said first and second belts form an angle $180-\theta$ degrees where said object changes direction.

4. In a conveyor wherein an object is conveyed along a path flanked by first belt means and second belt means, each belt means including belts supported on rollers having axes which are substantially parallel so that each roller is contacted by a belt at regions which are axially spaced from the regions at which any other belt contacts said roller, one run of each of said belts contacting said object so as to convey it along said path, said first belt means having a pivot roller, said path having a bend at said pivot roller upon which pivot roller an incoming belt and an outgoing belt are supported so as to define the convex side of the bend in the path, the concave side of said bend being formed by an intersection between neighboring belts in said second belt means, said neighboring belts comprising an incoming belt and an outgoing belt supported upon four rollers in such a manner that each neighboring belt is supported upon three of said four rollers of which two also support the other neighboring belt in such a manner that the neighboring belts do not intersect except for said intersection.

* * * * *